INVENTOR
Herbert K. Baker

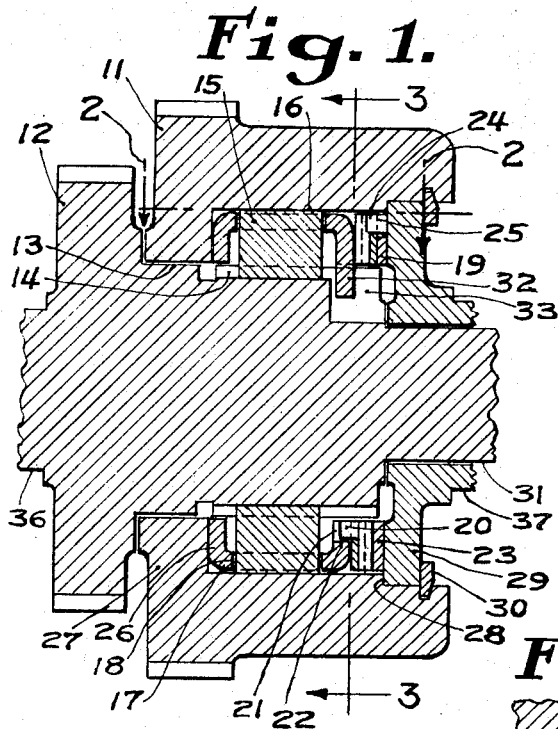
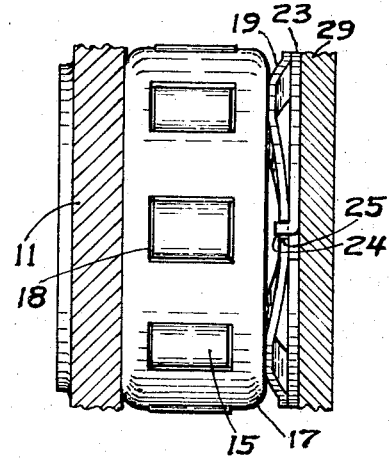
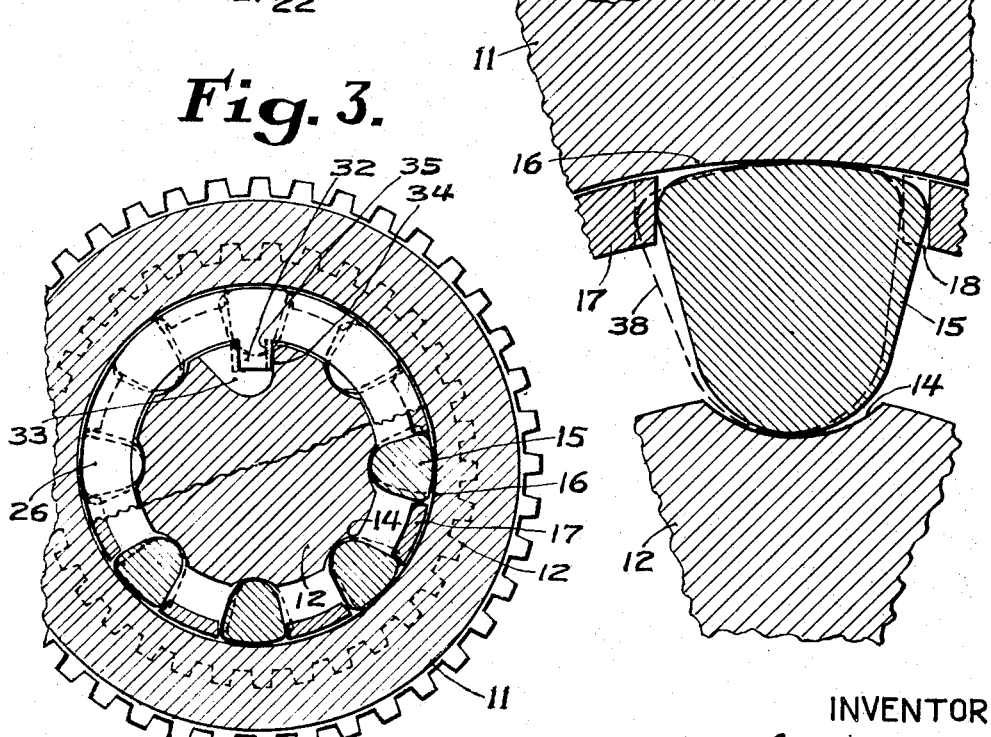

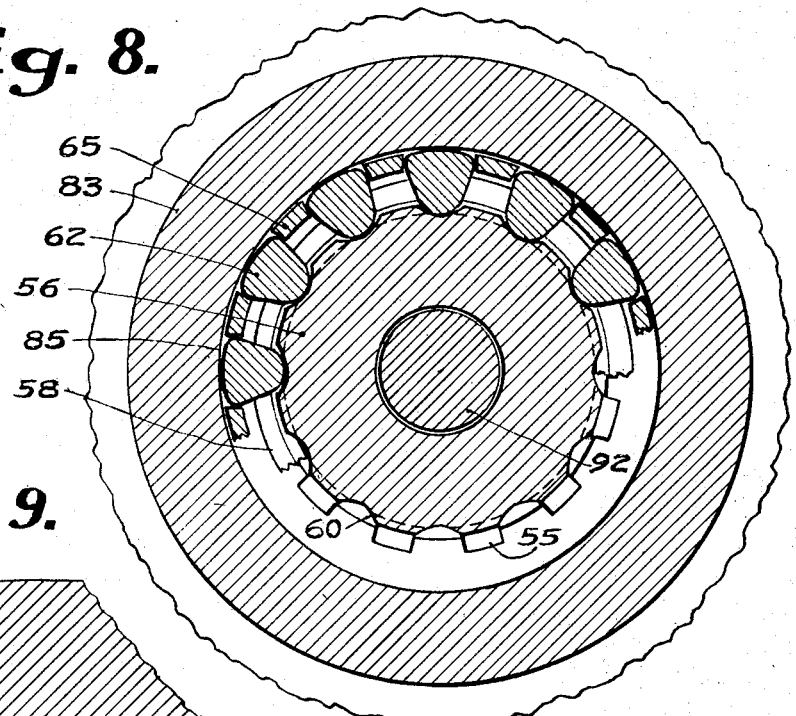
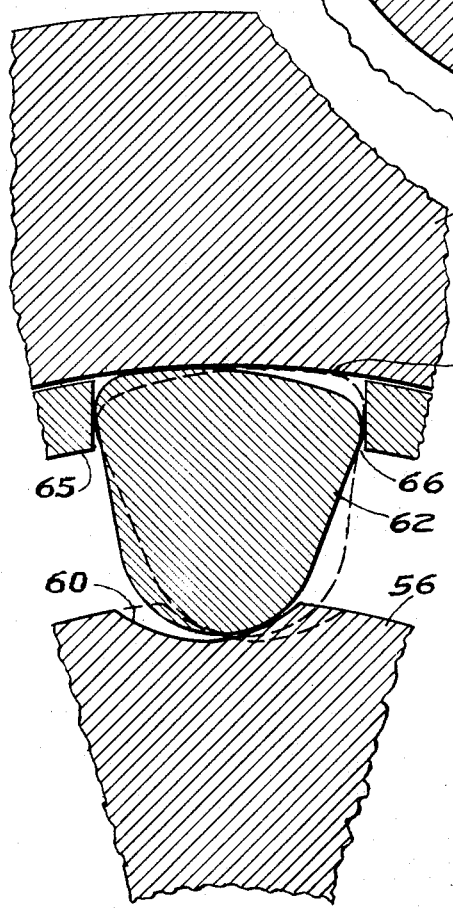
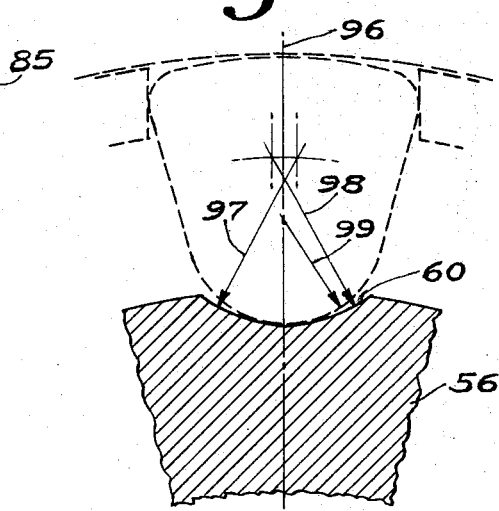

United States Patent Office 3,344,686
Patented Oct. 3, 1967

3,344,686
OVERRUNNING CLUTCHES INCLUDING
DIFFERENTIAL DRIVE DEVICES
Herbert K. Baker, Detroit, Mich.
(24481 Republic, Oak Park, Mich. 48237)
Filed Oct. 18, 1965, Ser. No. 496,811
25 Claims. (Cl. 74—650)

This invention relates to overrunning clutches for application in a variety of mechanisms including that of providing differential action such as encountered in the drive of motor vehicles.

My device, preferably, utilizes sprag type wedging elements acting between the drive and driven members of the clutch in a manner and arrangement to substantially prolong the life, increase the power transmitting capacity and improve functional dependability of such mechanisms over that of prior art.

A particularly desirable feature of this invention is provided by the positioning of one end of the sprags in support recesses of which each comprises a cam surface and these recesses are formed in a clutch member made operative thereby for either driving or driven action and adaptable to both such actions in either direction of rotation.

A feature to prolong the life of mechanisms of the character described herein is provided by my more favorable sprag engaging surface profiling which presents a greater proportion of their circumference to bear on respective contact surfaces of the driving and driven members, during wedging action. Such sprag profiling results in considerably less destructive indenting action, at a specific loading, comparatively, than by the roller or sprag elements of conventional practice and particularly as to these latter mentioned elements in their usual wedging contact with an uninterrupted external round shape of the inwardly contacted member which merely presents a wedging frictional contact bearing narrowed to a near line extent in contrast.

Experience has taught that longer operative life is obtained from overrunning clutch mechanisms when a circular series of rollers or sprags are each unyieldingly spaced apart so all the wedging elements, of a series, are compelled to act in unison as provided by my cage mounting of the sprags in the structures of the first and second forms of this invention, instead of yielding individually as prior art light springy type of cages do which permit uneven wear and stress to a condition of one, then more of the wedging elements start to overrun intended position from that of others so as to cause functional impairment.

Differential of movement, pertinent to overrunning clutches, between the driving and driven members initiate the wedging action of the rollers or sprags and the greater the loading, correspondingly, the greater the wedging action and consequent differential of movement to provide adequate clutching engagement and such variable extent of action is an accepted factor in the art. Thus, compensatingly, an equal and opposite extent of the differential movement is required for full release from a specific extent of clutching engagement.

Besides the aforementioned features of this invention being included in the first form of structure also are the means for full release from any required extent of clutch engagement by stop elements which, relative to a pair, one such element is carried in movement with a sprag cage identified as a first member, and the other stop element carried in movement by a clutch element, as a second member, having the cam recesses of either driving or driven characteristics. During clutching engagement, these stop elements, acting to the movement of their respective carrying members, move away from each other to the required extent of the clutching engagement of the second member with another clutch element, as a third member, for unison rotation therewith. Upon merely overrunning action by the second member provides the release therefrom of clutching engagement of the third member. During the release action, the stop elements move to abut against each other and at this point, then, the cage member and second member rotate in unison with the circumferential centers of the sprag apertures in the cage member precisely registering, radially, with the full release portion of the cam recesses of the second member to, thus, provide absolute operative release. By obvious modifications this mechanism may be utilized from one to the other rotating direction, or, for one-way braking.

Overrunning clutches have a fundamental advantage for differential drive mechanisms in motor vehicles by eliminating, entirely, the gearing reaction sustaining requirement of conventional differentials. This differential gearing reaction causes spin of a tractionless wheel and therewith loss of reaction sustainment with the corresponding loss of power to the other wheel even though having full traction.

Despite the fundamental advantages, aforementioned, of overrunning clutches for differential drives of motor vehicles, related prior art has failed to meet the requirements for high transmitting power capacity and the varied release movements in compensation for varied extents of clutching engagements to avoid functional impairment. For instance, a recent prior art disclosure comprises two series of rollers with each series mounted in a separate cage of a pair in adjacent endwise relation. The extent of release movement is always constant as provided by a fixed width of slot, in one cage, as a stop for a projection extending therein from the other cage. Therefore, by occurring differential of movement between the cages, if the width of slot is determined for an extent of movement at medium loading, this movement extent for release, in event of heavy loading would be short of accomplishment, in the event of light loading would overrun release. In both events functional impairment would occur.

Both structures of the first and second forms of this invention provide greater power transmitting capacity by virtue of the aforementioned enlarged operative circumferential contact by my sprags together with, support by camming recesses for one end of the sprags having a radius profile for a limited pivotal roll action against a progressively increasing angularity of camming profile producing, in coaction with the sprag apertures of the cages, an oscillating movement of the sprags. These camming recesses act, in a sense, as non-slip braces or fulcrums from which the sprags can exert greater wedging pressure than would be the case otherwise, against the contact surface of another coacting member for clutching engagement.

The sprags, of my disclosures herein, wedgingly act between, what may be termed, outer and inner clutch members. It is preferable that my camming recesses be formed in the inner member to strengthen its power sustaining action because this action is at a shorter lever arm and the outer member providing the smooth surface of internal round shape which is more efficient in minimizing slip and provides greater circumferential contact with a sprag than does the smooth surface of an external round which would be the case of the inner member if so formed. This arrangement further enhances the power transmitting capability by efficient distribution of the forces.

The structure of the second form of this invention is applicable for the differential drives of motor vehicles and comprises a two-way sprag clutch having two circular series of sprags, one such series operative with a right wheel and other series operative with a left wheel. Each series of sprags is mounted in separate cages and a differential of movement betwen the two cages, such as caused by one wheel overrunning the other wheel, compels the sprags, operative with the overrunning wheel, to oscillate in the unlocking action and advance their cage, rotatingly, ahead of the other cage which action is very moderately resisted by resilient compressive means which are mounted coactingly to both cages and operative in their rotatable paths in a manner resiliently tending to urge both cages to rotate together. This action stops the cage overrun at the moment the pressure release engagement of the sprags is reduced down to the resistance of the resilient compressive means, thus, providing adequate release movements for either series of sprags and in both directions, compensatingly, for all varied movement extents of clutch engagements operatingly encountered. This differential drive mechanism possesses, as aforementioned, the fundamental advantage over conventional differentials, and improved functional dependability for the requirements, in either driving direction, of vehicular turning and coasting with at least one wheel, always, under power or restraint control.

Another feature, applicable to the structures of both forms of this invention is provided by resilient means exerting, in an endwise direction, pressure on a cage member to abut against a clutch member having overrunning or stall characteristics for urging the sprag cage to act therewith so as to initiate sprag wedging action for clutching engagement of the drive and driven members. The abutting pressure on the cage member against the clutch member as to torque absorption is very light since the torque is relative to the coefficient of friction between the two lubricated abutted members and only need be a minor fraction of a very moderate abutting pressure, therefore, is a negligible factor as to effectiveness or interference of the resilient rotatable compressive means operative between the two cages in the structure of the second form of this invention.

Additional features and advantages will be apparent from the following descriptive matter and reference to the accompanying drawings in which:

FIGURE 1 is a central section taken lengthwise of the structure of the first form of this invention.

FIGURE 2 is a circular section taken at line 2—2 in FIGURE 1 which reveals a cage assembly with sprags.

FIGURE 3 is a cross section taken at line 3—3 revealing partially an end view of the sprag cage and the remainder of the cage and sprags in sectional view.

FIGURE 4 is an enlarged sectional view of a sprag and the adjacent area of its contact with other elements.

FIGURE 8 is a cross section taken at line 8—8 of FIGURE 5 revealing a portion of the sprags and their cage having the remainder of the cage and sprags removed to reveal a portion of a bevelled snap ring with a portion broken away to show the spline profile for the ring gear drive connection.

FIGURE 9 is an enlarged sectional view of a sprag in clutching engagement and the broken lines indicate the sprag clutching engagement position by differential movement of opposite direction.

FIGURE 10 is an enlarged sectional view of a cam recess utilizing a profile of offset radii from the center thereof. The broken lines indicate the sprag in a full released position.

*Overrunning clutch—first form*

Figure 5:
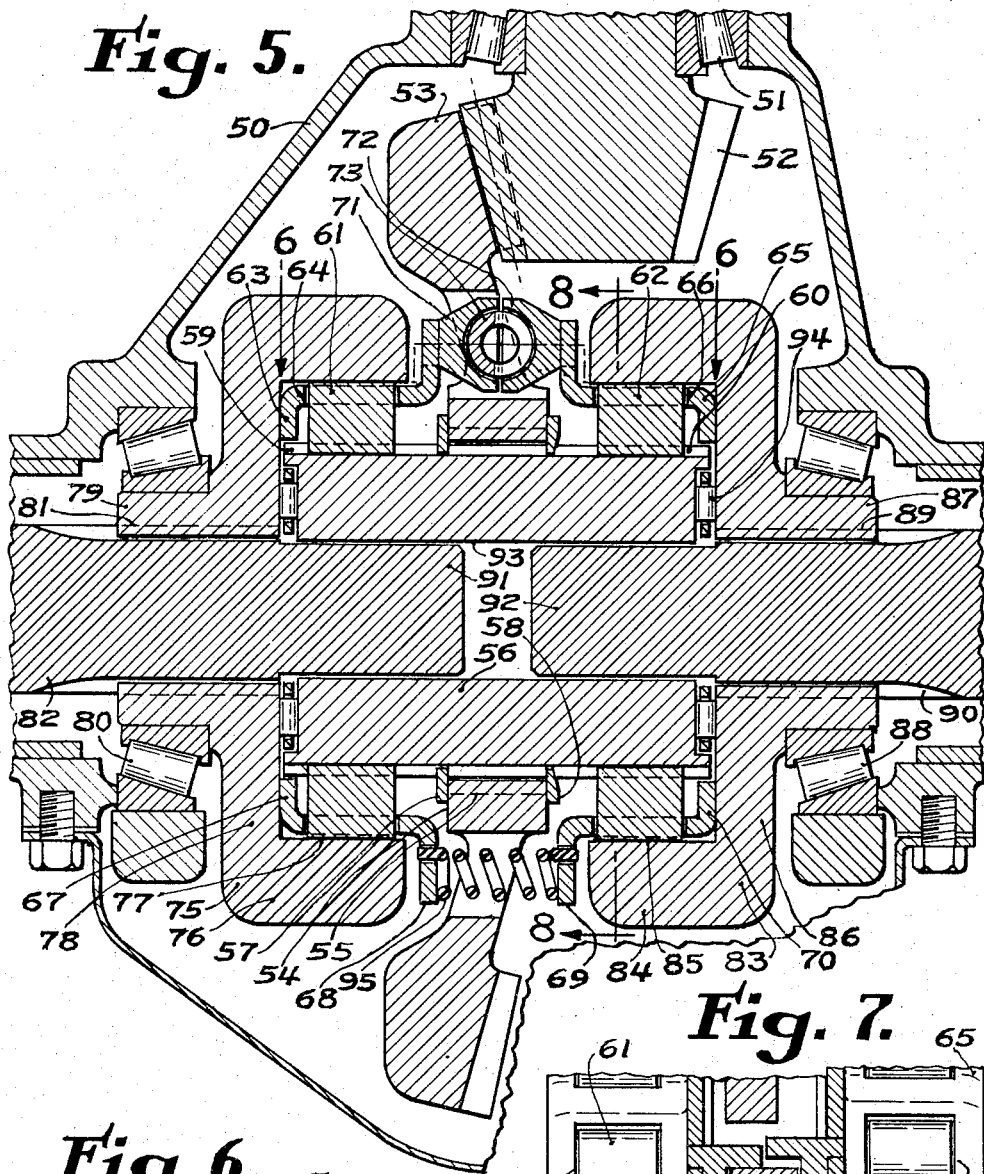
FIGURE 5 is a central section taken lengthwise of the structure of the second form of this invention.
Figure 6:
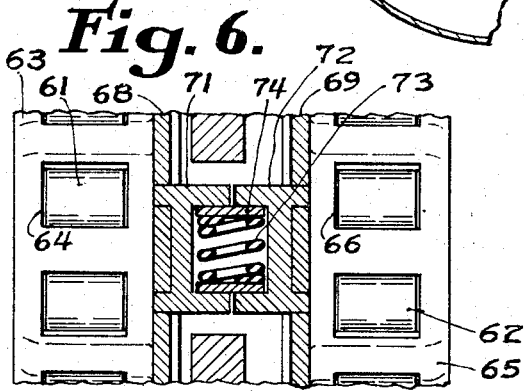
FIGURE 6 is a circumferential section, to partially reveal the sprag cage assemblies, taken at a line 6—6 of FIGURE 5 and this line staggered outwardly at the inner flanges of the two sprag cages to reveal in section a resilient compressive means coactingly operative between the two cages in a rotative direction.
Figure 7:
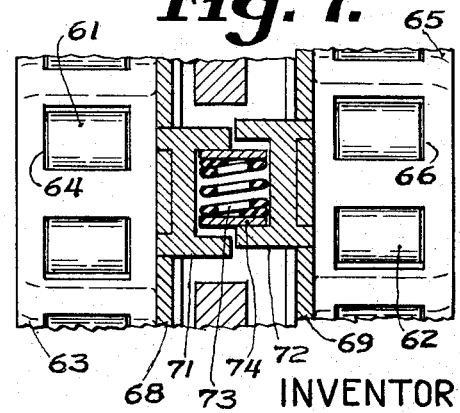
FIGURE 7 is a similar sectional view as FIGURE 6 except as to the right hand sprag cage shown advanced, by the right wheel overrun, with the sprags operative therewith in a released position while the sprags operative with the left hand wheel are in clutching engagement and the rotatingly resilient compressive means shown in operative relation between the two cage members.

Referring to the drawings and particularly to FIGURES 1 to 4 inclusive, there is shown a combined clutch and gear driving member 11. Another combined clutch and gear driving member is 12 which has a hub 13 with cam recesses 14 in a circular series formed therein. Sprags 15 are supported on the cam recesses 14 for wedging action, by the sprags 15, against the internal round surface 16 of the gear driving member 11. A cage member 17 having a circular series of apertures 18 for uniform spacing of sprags 15 therein. A crimped spring washer 19 having a formed lug 20 projecting into a notch 21 of an end flange 22 of cage 17 in a manner causing the spring washer 19 to turn with the cage 17. A thrust washer 23 having formed lug 24 projecting into notch 25 of spring washer 19 for this thrust washer 23 to turn with the spring washer 19 and cage 17. An opposite end flange 26 of cage member 17 being pressure abutted, by spring washer 23, against the interior surface of flange 27 of gear driving member 11 and the flange 27 being bored for rotatable support on hub 13 of gear driving member 12. Gear driving member 11 has a bored shoulder 28 against which a flanged support member 29 is abutted and held to place by a bevelled snap ring 30 inserted in a corresponding groove of the gear member 11. The support member 29 is bored for rotatable support on an output shaft 31 which is shown formed integral with gear driving member 12.

A projection 32, functioning as a stop element, is formed integral with the end flange 22 of cage member 17 and projects into a recess 33 formed in hub 13 with the recess 33 having a radial extending shoulder 34 as the other stop element of a pair that abut each other when release of the sprags 15 is obtained from clutching engagement. The broken lines 35 (FIGURE 3) indicate the stop element 32 moved away from stop element 34 which occurs during clutching engagement. Referring to FIGURE 1, gear driving member 12 and support member 29 have stepped diameters respectively 36 and 37 for rotatable support by bearings (not shown). The broken lines 38 (FIGURE 4) indicate the clutching position of the sprags 15 when gear driving member 11, in a counterclockwise rotating direction, is clutched with and drives output shaft 31. The hatched solid line profile of sprag 15 indicates its released position with gear member 11 for gear member 12 to overrun gear member 11 and directly drive output shaft 31 in a counterclockwise rotating direction.

In the operation of the first form of this invention FIGURES 1 to 4 inclusive, a heavy duty power source (not shown) may be connected to the gear member 11 to start up the mechanism under heavy load. At startup, the resilient endwise pressure exerted on the cage member 17 moderately urges this cage member to turn with the gear member 11 to, thus, initiate the wedging action of the sprags 15 supported on the cam recesses 14 which, at startup, are stalled with the output shaft 31 and then upon attaining clutching engagement with gear member 11, the sprags 15, cage member 17 and output shaft 31 rotate in unison therewith. When sufficient momentum is achieved, a lighter duty power source, such as may be an electric motor (not shown) drive connected to gear member 12 takes over and merely at an overrunning speed releases gear member 11 and its power source from driving output shaft 31 which now is driven directly by gear member 12. Upon overrun of cam recesses 14 with gear member 12 and the cage member 17 urged to act, momentarily, with gear member 11, the differential of movement causes the stop elements 32 and 34 to come to abutment at which point the cage member 17 and gear member 12 rotate in unison with the circumferential centers of the sprag apertures 18 of cage member 17 precisely registering, radially, with the full release portion of the cam recesses 14. The actions just before mentioned can be obtained for the opposite rotating direction by the modification of reversing the shoulder 34, as a stop element, to the other side of recess 33 of hub 13. Action of this mechanism for a one-way brake can be had by holding stationary either one of the gear members 11 or 12 while the other one is permitted to free wheel in one direction, by this arrangement. The same modification, as aforementioned, respecting the shoulder 34 of recess 33 will make the action operative in the other rotating direction.

*Overrunning clutch—second form*

The structure, of the second form of this invention, applicable to differential drives of motor vehicles is shown in FIGURES 5 to 10 inclusive. A housing enclosing the mechanism is designated 50 which is bored to support a bearing 51 in turn rotatably supporting a pinion member 52 drivingly meshed with ring gear 53 having a hub 54 splined as at 55 to a clutch member 56 and this clutch member has a groove for insertion therein of a snap ring 57 and abutting there against is the left hand face of hub 54 of ring gear 53. Another groove correspondingly formed, to insert therein the bevelled snap ring 58, in clutch member 56 and this snap ring 58 wedgingly presses against the right hand face of hub 54 to hold ring gear 53 rigidly to position axially. The clutch member 56 has formed therein two circular series of cam recesses, the recesses 59 are of the left hand series and recesses 60 are of the right hand series. Supported on the cam recesses 59 are sprags 61 and on cam recesses 60 are sprags 62. A cage member 63 with sprag apertures 64 uniformly space sprags 61 in a left hand circular series and a cage member 65 with sprag apertures 66 uniformly space sprags 62 in a right hand circular series, in a manner that the spacing of the cam recesses and the sprag apertures of the cage members, correspondingly, register precisely uniform operatively.

The cage member 63 has a left hand flange 67 and a right hand flange 68. The cage member 65 has a left hand flange 69 and a right hand flange 70. A spring retainer 71 with a half round recess is mounted to rotatingly act with flange 68 of cage 63. A spring retainer 72 likewise with a half round recess is mounted to rotatingly act with flange 69 of cage 65. The half round recesses of retainers 71 and 72 are oppositively arranged so as to jointly encircle spring 73. At opposite ends of spring 73 washers 74 abut and at opposite ends of the recesses of retainers 71 and 72 are enclosures which with washers 74 are arranged to compress the spring 73 upon the overrunning of one cage member relative to the other in either direction of rotation.

A left hand clutch member 75 having an outer rim 76 with an internal diametrical surface 77 for wedging engagement by sprags 61 and this clutch member having a radial extending web 78 from a hub 79 thereof with this hub formed to be rotatably supported by the inner race of bearing 80 of which the outer race is supported in a bore of housing 50. The internal bore of hub 79 is splined as at 81 to drivingly connect this clutch member 75 with the left hand wheel shaft 82. A right hand clutch member 83 has an outer rim 84 with an internal diametrical surface 85 for wedging engagement by sprags 62 and this clutch member has a radial extending web 86 from a hub 87 thereof with this hub formed to be rotatably supported by the inner race of bearing 88 of which the outer race is supported in a bore of housing 50. The internal bore of hub 87 is splined as at 89 to drivingly connect this clutch member 83 with the right hand wheel shaft 90.

The left hand wheel shaft 82 has extending from the splined portion, as at 81, a stepped down diameter 91.

The right hand wheel shaft 90 has a similar stepped down diameter 92 extending from its splined portion as at 89. The stepped down diameters 91 and 92, of respectively wheel shafts 82 and 90, function as pilots extending into the bore 93 of clutch member 56 which at each end thereof are formed circular recesses and mounted therein are roller thrust bearings 94. A spring 95 is mounted on and under compression between flanges 68 and 69 respectively of cage members 63 and 65. This spring 95 exerts an endwise resilience to the cages so that flange 67 of cage 63 pressure abuts the interior surface of web 78 of clutch member 85. Similarly, flange 70 of cage 65 pressure abuts the interior surface of web 86 of clutch member 83.

The enlarged sprag 59 profile shown in FIGURE 9 discloses that the sprag is tapered to be wider at the cage aperture 66 than at the cam recess 60. Cam recesses 59 and 61 are similar in profile. FIGURE 10 shows an enlarged sectional profile of a cam recess disclosing the profile formed by offset radii from the center line 96. Half the profile is by radius to the left but centered to the right of the center line 96 as indicated by the arrowed line 97 and the other half of the profile is by radius to the right but centered to the left of he center line 96 as indicated by the arrowed line 98. The arrowed line 99 centered at the center of the broken line profile of the sprag indicates a single radius profile at that end of the sprag which as shown is in full release position. The cam recess profiling of FIGURE 10 nests the radius nose of the sprag to a closer tolerance of movement than does the single radius profile of the cam recesses 14 as shown in FIGURES 3 and 4 of the first form of this invention.

Let it be assumed that a mechanism embodying the structure of the second form of this invention is utilized for the differential drive of a motor vehicle and that a propeller shaft (not shown) is in driving connection to the pinion 52, also a wheel (not shown) is drivingly attached to each of the wheel shafts 82 and 90 shown in FIGURE 5.

For startup of the vehicle, the propeller shaft commences to turn pinion 52 and ring gear 53 including therewith clutch member 56 with its two series of cam recesses 59 and 60 which support, pivotally, the adjacent ends of sprags 61 and 62 while, momentarily, the wheels and their wheel shafts 82 and 90 are stalled and therewith the clutch members 75 and 83 together with, resiliently abutted thereto, the cage members 63 and 65 having, respectively, apertures 64 and 65 for the mounting therein of the wider ends of these sprags. The clutch member 56 exerts a differential of movement, rotatingly, relative to stall of the cage members 63 and 65. With this differential of movement directed to opposite ends of the sprags 61 and 62 causes them to oscillate into a wedging action of clutching engagement of clutch member 56 to the clutch members 75 and 83 to rotate in unison therewith including the wheel shafts 82 and 90 with their wheels in an action of vehicle startup in a straightaway drive.

In a vehiclular straightaway forward drive the action of the clutch member 56 is in a counterclockwise driving rotation, looking toward the right wheel, with both series of sprags 61 and 62 oscillated to a wedging action against the internal diametrical surfaces 77 and 85 of, respectively, clutch members 75 and 83 which then rotate in unison with clutch member 56. This action is represented by FIGURE 9 showing such operative arrangement of clutch member 83, clutch member 56 with the cam recess 60 thereof, sprag 61 and sprag aperture 66 of cage 65 as indicated by solid line profile bordering the hatching thereof. The broken line profile indicates the relation of the sprags and cam recesses during vehicular reverse straightaway drive operation whereby the clutch member 56 is rotated in a clockwise direction, looking toward the right wheel. Further, this broken line profiling also indicates the sprag and cam recess relation to adjacent elements, during forward straightaway vehicular coasting whereby the wheels become the driving elements therewith clutch members 75 and 83 and through the sprags drive clutch member 56 counterclockwise. Reverse straightaway vehicular coasting is represented by the solid line profiling in FIGURE 9, however, in this event, all the clutch members rotate clockwise looking toward the right wheel.

Starting on a curve or a corner turn the outside wheel of a vehicle begins to rotate faster than the inside wheel, thus, effecting progressive release oscillation of the sprags in their wedging pressure against the coacting clutching members, pertinent to the faster wheel, and overrun of the cage member associated therewith until the sprag wedging pressure is diminished down to that of the moderate resistance of the resilient compressive means acting between the pair of cage members in their rotatable directions, at which point, this series of sprags continue in released position until the phase of action again changes. FIGURE 8 shows sprags of a series in released position as does the enlarged view of a sprag indicated by broken lines in FIGURE 10. This release action occurs when turning in forward or reverse, whether driving or coasting, however, in coasting while turning the slower wheel releases its clutching engagement and the faster wheel remains in clutching engagement.

My feature limiting movement differential between cage members by diminishing sprag wedging pressure to equalization with opposing resilient means is not limited to the structure described therewith as this feature can be embodied in roller or other sprag type differential drive mechanisms.

The foregoing description of my invention has disclosed two forms thereof, numerous other modifications and variations can be made falling within the spirit and scope of this invention.

I claim:

1. An overrunning clutch comprising a pair of clutch members operatively spaced apart in unyielding relation, a circular series of sprags interposed between the clutch members, each sprag having opposite engaging surfaces spaced an effective distance apart for wedging action against each of the pair of clutch members, a cage member having a circular series of apertures with a portion of each sprag mounted therein, a circular series of cam recesses formed in a clutch member in an arrangement of each cam recess to act upon an opposite portion of the sprag to that portion mounted in the cage member, resilient means for abutting the cage member against a clutch member to provide a differential of rotative movement between the cage member and the clutch member with the cam recesses in arrangement for initiating oscillation of the sprags, into a wedging action of clutch engagement or, for a reverse action providing clutch release.

2. An overrunning clutch comprising a pair of clutch members operatively spaced apart in unyielding relation, a circular series of sprags interposed between the clutch members, each sprag having opposite engaging surfaces spaced an effective distance apart for wedging action against each of the pair of clutch members, said engaging surfaces of the sprags in arrangement of one being a larger radius contour portion and the other being of a smaller radius contour portion, a cage member having a circular series of apertures with the larger radius contour portion of each sprag mounted therein, a circular series of cam recesses formed in a clutch member in an arrangement of each cam recess to act upon the smaller radius contour portion of a sprag, resilient means for abutting the cage member against a clutch member to provide a differential of rotative movement between the cage member and the clutch member with the cam recesses in arrangement initiating oscillation of the sprags, into a wedging action of clutch engagement or, for reverse action providing clutch release.

3. An overrunning clutch comprising a pair of clutch members operatively spaced apart in unyielding relation, a circular series of sprags interposed between the clutch members, each sprag having opposite engaging surfaces spaced an effective distance apart for wedging action against each of the pair of clutch members, said engaging surfaces of the sprags in arrangement of one being of a larger radius contour portion and the other being of a smaller radius contour portion, a cage member having a circular series of apertures with the larger radius contour portion of each sprag mounted therein, a circular series of cam recesses formed in a clutch member in an arrangement of each cam recess to act upon the smaller radius contour portion of a sprag, a crimped spring washer mounted to exert a resilient endwise pressure on the cage member to abut against a clutch member, to provide a differential of rotative movement between the cage member and the clutch member with the cam recesses in arrangement for initiating oscillation of the sprags, into a wedging action of clutch engagement or, for a reverse action providing clutch release.

4. An overrunning clutch as set forth in claim 2, including an arrangement of a pair of stop elements of one carried by said cage member and the other by said clutch member with the cam recesses to provide an action whereby the stop elements are moved away from each other during clutch engagement and abut each other upon clutch release.

5. An overrunning clutch as set forth in claim 3, including an arrangement of a pair of stop elements of one carried by said cage member and the other by said clutch member with the cam recesses to provide an action whereby the stop elements are moved away from each other during clutch engagement and abut each other upon clutch release.

6. An overrunning clutch comprising a pair of clutch members operatively spaced apart in unyielding relation, one of the clutch members having an external round portion with a series of cam recesses formed there around and the other clutch member having an internal round surface for engaging action, a circular series of sprags interposed between the clutch members, each sprag having opposite engaging surfaces spaced an effective distance apart for wedging action against each of the pair of clutch members, a cage member having a circular series of apertures with a portion of each sprag mounted therein, each sprag arranged to have the opposite portion acted upon by the cam recesses, resilient means for abutting the cage member against a clutch member to provide a differential of rotative movement between the cage member and the clutch member with the cam recesses in arrangement for initiating oscillation of the sprags, into a wedging action of clutch engagement or, for a reverse action providing clutch release.

7. An overrunning clutch as set forth in claim 6, including an arrangement of a pair of stop elements of one carried by said cage member and the other by said clutch member with the cam recesses to provide an action whereby the stop elements are moved away from each other during clutch engagement and abut each other upon clutch release.

8. An overrunning clutch comprising a pair of clutch members operatively spaced apart in unyielding relation, one of the clutch members having an external round portion with a series of cam recesses formed there around and the other clutch member having an internal round surface for engaging action, a circular series of sprags interposed between the clutch members, each sprag having opposite engaging surfaces in arrangement of one such surface being of a larger radius profile portion and the other surface of a smaller radius profile portion, a cage member having a circular series of apertures with the larger radius profile portions of the sprags mounted therein, said smaller radius profile portions of the sprags in arrangement for action thereupon by said cam recesses of one of the clutch members and means to exert an endwise thrust on the cage member to resiliently abut the other clutch member for rotative movement responsiveness therewith, a pair of stop elements one of which being a projection extending radially inward from the cage member, the other stop element being a radially extending shoulder of an end recess formed in the clutch member with the cam recesses, said stop element as a projection extends into the end recess with the shoulder stop element to permit responsive movement of the cage member in a direction to abut the stop elements together for registering the cage member apertures radially with the clutch member cam recesses to provide clutch release while opposite responsive movement initiates clutch engagement.

9. An overrunning clutch as set forth in claim 8, including the said cam recesses formed by offset radius whereby half of the profile is by radius to the left but centered to the right of the cam recess circumferential center and to the left thereof is centered the radius of the right half profile.

10. An overrunning clutch comprising a pair of clutch members operatively spaced apart in unyielding relation, one of the clutch members having an external round portion with a series of cam recesses formed there around and the other clutch member having an internal round surface for engaging action, a circular series of wedging elements interposed between the clutch members, a cage member having a circular series of apertures with the wedging elements mounted therein, means to exert an endwise thrust on the cage member to resiliently abut the clutch member with the internal round surface for rotative movement responsiveness therewith, a pair of stop elements one of which being a projection extending radially inward from the cage member, the other stop element being a radially extending shoulder of an end recess formed in the clutch member with the cam recesses, said stop element as a projection extends into the end recess with the shoulder stop element to permit responsive movement of the cage member in a direction to abut the stop elements together for registering the cage member apertures radially with the clutch member cam recesses to provide clutch release while opposite responsive movement initiates clutch engagement.

11. An overrunning clutch comprising a pair of clutch members operatively spaced apart in unyielding relation, a circular series of wedging elements interposed between the clutch members, a cage member having a circular series of apertures for mounting the wedging elements therein, a circular series of cam recesses formed in one of the clutch members to act upon the wedging elements, resilient means for abutting the cage member against a clutch member for responsive movement therewith as a differential of movement relative to the other clutch member having the cam recesses, a pair of stop elements in an arrangement of one carried by said cage member and the other by said clutch member with the cam recesses to provide an action whereby the stop elements are moved away from each other during clutch engagement and abut each other upon clutch release.

12. An overrunning clutch as set forth in claim 11, including the said cam recesses formed by offset radii whereby half of the profile is by radius to the left but centered to the right of the cam recess circumferential center and to the left thereof is centered the radius of the right half profile.

13. A differential drive mechanism comprising a pair of interacting overrunning clutches interposed between a drive member and a pair of driven shafts, a pair of engaging members for each of said clutches with one engaging member of each pair in driving connection with said drive member and the other engaging member of each pair in driving connection of each to a separate driven shaft, two circular series of sprags with each series thereof interposed between the engaging members of each pair, a pair of cage members each having a separate series of sprags mounted therein, resilient means exerted on the cage members in an endwise direction thereof for abutting each cage member against an adjacent engaging member of each pair for responsive rotative movement therewith, additional resilient means operative in a rotative direction coactingly between the pair of cage members in an arrangement of moderately urging the cage members to rotate in unison in a manner to permit sprag release in either one of said clutches by exertion of an overrun or an underrun of its cage member to an extent of diminished sprag wedging pressure to a release factor corresponding to the urging pressure of said resilient means while the sprags of the other clutch are engaged.

14. A differential drive mechanism as set forth in claim 13, including two circular series of cam recesses of which one such series is formed in an engaging member of each of said clutches.

15. A differential drive mechanism comprising a pair of interacting overrunning clutches interposed between a drive member and a pair of driven shafts, a pair of engaging members for each of said clutches with one engaging member of each pair in driving connection with said drive member and the other engaging member of each pair in driving connection with each of said driven shafts, two circular series of cam recesses of which one such series of cam recesses is formed in an engaging member of each of said clutches, two circular series of wedging elements with each series thereof interposed between the engaging members of each pair, a pair of cage members each having a separate series of wedging elements mounted therein, resilient means exerted on the cage members in an endwise direction thereof for abutting each cage member against an adjacent engaging member of each pair for responsive rotative movement therewith, additional resilient means operative in a rotative direction coactingly between the pair of cage members in an arrangement of moderately urging the cage members to rotate in unison in a manner to permit wedging element release in either one of said clutches by exertion of an overrun or an underrun of its cage member to an extent of diminished wedging element pressure to a release factor corresponding to the urging pressure of said resilient means while the wedging elements of the other clutch are engaged.

16. A differential drive mechanism comprising a pair of interacting overrunning clutches interposed between a drive member and a pair of driven shafts, a pair of engaging members for each of said clutches with one engaging member of each pair in driving connection with said drive member and the other engaging member of each pair of driving connection with each of said driven shafts, two circular series of cam recesses of which one such series is formed in an engaging member of each of said clutches, two circular series of sprags with each series thereof interposed between the engaging members of each pair, each sprag having opposite engaging surfaces spaced an effective distance apart for wedging action against each of a pair of engaging members of said clutches, a pair of cage members of which each has a circular series of apertures with a portion of each sprag mounted therein, said cam recesses arranged to act upon opposite portions of the sprags to that portion mounted in the apertures of the cage members, resilient means exerted on the cage members in an endwise direction thereof for abutting each cage member against an adjacent engaging member of each pair for responsive rotative movement therewith, additional resilient means operative in a rotative direction coactingly between the pair of cage members in an arrangement of moderately urging the cage members to rotate in unison in a manner to permit sprag release in either one of said clutches by exertion of an overrun or an underrun of its cage members to an extent of diminished sprag wedging pressure to a release factor corresponding to the urging pressure of said resilient means while the sprags of the other clutch are engaged .

17. A differential drive mechanism as set forth in claim 16, including said engaging surfaces of the sprags in arrangement of one being of a larger radius contour portion and the other of a smaller radius contour portion with said portion of each sprag mounted in the apertures of the cage members being of the larger radius contour and that portion of the sprag for action thereupon by the cam recesses being of the smaller radius contour.

18. A differential drive mechanism as set forth in claim 16, including the said cam recesses formed by offset radii whereby half of the profile is by radius to the left but centered to the right of the cam recess circumferential center and to the left thereof is centered the radius of the right half profile.

19. A differential drive mechanism comprising a pair of interacting overrunning clutches interposed between a drive member and a pair of driven shafts, a pair of engaging members for each of said clutches with one engaging member of each pair in driving connection with said drive member and the other engaging member of each pair in driving connection with each of said driven shafts, two circular series of cam recesses of which one such series is formed in an engaging member of each of said clutches, said cam recesses formed by offset radii whereby half of the profile is by radius to the left but centered to the right of the cam recess circumferential center and to the left thereof is centered the radius of the right half profile, two circular series of sprags with each series thereof interposed between the engaging members of each pair, each sprag having opposite engaging surfaces spaced an effective distance apart for wedging action against each of a pair of engaging members of said clutches, a pair of cage members each having a circular series of apertures with a portion of each sprag mounted therein, said engaging surfaces of the sprags in arrangement of one being of a larger radius contour portion and the other of a smaller radius contour portion with said portion of each sprag mounted in the apertures of the cage members being of the larger radius contour and that portion of the sprag for action thereupon by the cam recesses being of the smaller radius contour, resilient means exerted on the cage members in an endwise direction thereof for abutting each cage member against an adjacent engaging member of each pair for responsive rotative movement therewith, additional resilient means operative in a rotative direction coactingly between the pair of cage members in an arrangement of moderately urging the cage members to rotate in unison in a manner to permit sprag release in either one of said clutches by exertion of an overrun or an underrun of its cage member to an extent of diminished sprag wedging pressure to a release factor corresponding to the urging pressure of said resilient means while the sprags of the other clutch are engaged.

20. A differential drive mechanism comprising a pair of interacting overrunning clutches interposed between a drive member and a pair of driven shafts, a pair of engaging members for each of said clutches with one engaging member of each pair in driving connection with said drive member and the other engaging member of each pair in driving connection with each of said driven shafts, two circular series of sprags with each series thereof interposed between the engaging members of each pair, each sprag having opposite engaging surfaces of one being of a larger radius contour portion and the other of a smaller radius contour portion, a pair of cage members of which each includes a circular series of apertures with the larger radius contour portions of the sprags mounted in said apertures, two circular series of cam recesses of which one such series is formed in an engaging member of each of said clutches and the smaller radius contour portions of the sprags arranged for action thereupon by the cam recesses, resilient means for abutting each cage member against an adjacent engaging member thereto for rotative movement responsiveness therewith to provide a differential of rotative movement between the cage member and the engaging member with the cam recesses in an arrangement for initiating oscillation of the sprags, into a wedging action of clutch engagmeent or, for a reverse action providing clutch release.

21. A differential drive mechanism comprising a pair of interacting overrunning clutches interposed between a gear drive member and a pair of driven shafts, said gear having a central hub drivingly connected to an external round clutch member having a groove with a snap ring positioned therein with a hub face of the gear abutted thereagainst by a bevelled snap ring positioned in a corresponding groove at the opposite hub face for wedgingly locking the gear to a predetermined axial position, said external round clutch member including two circular series of cam recesses formed therein, a pair of clutch members each provided with an internal round engaging surface and said clutch members drivingly connected one to each driven shaft, two circular series of wedging elements interposed between the cam recesses and the internal round engaging surfaces of said clutch members, a circular series of apertures with the wedging elements mounted therein, resilient means for exerting endwise abutting pressure of the cage members against adjacent clutch members for responsive rotative movement therewith for providing a movement differential between either cage member and the clutch member with the cam recesses, additional resilient means operative in either rotative direction coactingly between the cage members for limiting the movement differential extent thereof at clutch release with pressure equalization thereat with said resilient means.

22. A differential drive mechanism as set forth in claim 21, including the said cam recesses formed by offset radii whereby half of the profile is by radius to the left but centered to the right of the cam recess circumferential center and to the left thereof is centered the radius of the right half profile.

23. A differential drive mechanism comprising a pair of interacting overrunning clutches interposed between a gear drive member and a pair of driven shafts, said gear having a central hub connected to an external round clutch member having a groove with a snap ring positioned therein with a hub face of the gear abutted thereagainst by a bevelled snap ring positioned in a corresponding groove at the opposite hub face for wedgingly locking the gear to a predetermined axial position, said external round clutch member including two circular series of cam recesses formed therein, a pair of clutch members each provided with an internal round engaging surface and said clutch member drivingly connected one to each driven shaft, two circular series of sprags interposed between the cam recesses and the internal round engaging surfaces of the clutch members, a pair of cage members each including a circular series of apertures with a portion of each sprag mounted therein, each sprag arranged to have the opposite portion acted upon by the cam recesses, resilient means for exerting an endwise abutting pressure of the cage members against adjacent clutch members for responsive rotative movement therewith for providing a movement differential between either cage member and the clutch member with the cam recesses, additional resilient means operative in either rotative direction coactingly between the cage members for limiting the movement differential extent thereof at clutch release with pressure equalization thereat with said resilient means.

24. A differential drive mechanism as set forth in claim 23, including said sprags having a larger radius contour portion which are mounted in the apertures of the cage members and an opposite smaller radius contour portion of the sprags arranged for action thereupon by the cam recesses.

25. A differential drive mechanism as set forth in claim 23, including the said cam recess formed by offset radii whereby half of the profile is by radius to the left but centered to the right of the cam recess circumferential center and to the left thereof is centered the radius of the right half profile.

(References on following page)

References Cited

UNITED STATES PATENTS

| | | | |
|---|---|---|---|
| 1,626,156 | 4/1927 | Ross | 192—45.1 X |
| 1,804,014 | 5/1931 | Joseph | 192—44 X |
| 1,977,588 | 10/1934 | Matson | 192—45 X |
| 2,332,061 | 10/1943 | Conkle | 188—82.84 X |
| 3,102,618 | 9/1963 | Lund | 192—45.1 X |
| 3,194,369 | 7/1965 | Witte | 192—45.1 |
| 3,283,611 | 11/1966 | Weismann et al. | 74—650 |

DONLEY J. STOCKING, *Primary Examiner.*

J. R. BENEFIEL, *Assistant Examiner.*